Nov. 6, 1962

C. O. KREUTZER 3,061,966

METHOD OF REMOVING FISH TRAPPED IN POCKET

Filed Nov. 3, 1960

INVENTOR.
CONRADIN O. KREUTZER

BY Arthur H. Robert

ATTORNEY

Nov. 6, 1962     C. O. KREUTZER     3,061,966
METHOD OF REMOVING FISH TRAPPED IN POCKET
Filed Nov. 3, 1960     2 Sheets-Sheet 2

INVENTOR.
CONRADIN O. KREUTZER
BY *Arthur Robert*
ATTORNEY 3,061,966
METHOD OF REMOVING FISH TRAPPED
IN POCKET
Conradin Otto Kreutzer, Lewes, Del., assignor to Smith Research and Development Company, Inc., Lewes, Del., a corporation of Delaware
Filed Nov. 3, 1960, Ser. No. 67,097
7 Claims. (Cl. 43—4.5)

This invention relates to an improved method of removing fish, which are trapped in the waters of a pocket providing them with swimming room but preventing them from escaping.

Commercial fishermen today usually use a purse seine for catching menhaden and like fish which travel in great schools. A purse seine is "set" by progressively extending the net horizontally around a school of fish until it forms a vertically-arranged open-ended cylinder encircling the school and then pursing the net by closing the bottom end of that cylinder. The two vertical end portions of the net, which were overlapped in forming the cylinder, and its pursed bottom edge, are then hauled from the water (manually or by power blocks) until the square center section of the seine forms a large "bag" or "pocket" from which the trapped fish cannot escape except by swimming over its upper edge, which is held at the surface of the water by floats, or by tearing a hole in the net.

The trapped fish may be and usually are removed from the pocket of the seine by suctioning them through the hose of a large suction pump. However, in order for the suction pump to be effective, the fish in the pocket must be "dried out," i.e. concentrated into an almost solid mass. This is normally done by manually hauling the upper end of the pocket out of the water until the size of the pocket in the water is reduced sufficiently to concentrate the fish in the pocket to the point where they can't swim and therefore become pumpable.

The "drying out" operation is a time-consuming laborious operation often complicated by the tremendous forces which the trapped fish sometimes frantically apply to the bottom and sides of the net in trying to escape therefrom. During the manual operation of raising the net, the load involved becomes heavier and heavier as the density of the mass of fish within the pocket increases. As a matter of fact, in the heavier catches, the load may become so great as to render it physically impossible for the 22 to 24 men (which are conventionally employed in two purse boats), to raise the pocket enough to "dry-out" the fish and render them pumpable. In such cases, the purse boats will overturn if the "drying" operation continues; hence, the net must be opened and the fish permitted to escape.

The principal object of this invention is to provide a fast and relatively easy method for removing trapped fish from a pocket providing them with swimming room but preventing them from escaping, without requiring the usual "drying out" operation.

Another object of this invention is to effect a substantial reduction in the labor and time required to remove trapped fish from a "watery" pocket, i.e. a pocket providing the fish with swimming room.

Another object of this invention is to provide a method for removing and recovering those catches of trapped fish which are too large to be "dried out" and which heretofore have had to be released.

I have found that fish, which are trapped in waters of a pocket providing them with swimming room but preventing them from escaping, may be recovered from that pocket by performing these steps, viz: (a) providing the waters of the pocket with the inlet of a suction hose; (b) electrifying the waters of the pocket with an electro-fishing current of such strength and direction as to cause the trapped fish to swim toward and congregate at the hose inlet in sufficient numbers to enable them to be suctioned from the water into and through the hose to a suitable receiver; and then (c) suctioning the congregated fish through the hose. If the pocket is too large to place the fish within the effective reach of the electro-fishing current, one may reduce its size sufficiently to enable all of the trapped fish to be placed under the influence of the electro-fishing current. However, even then, it is not necessary to reduce the pocket to the extent required to "dry out" the fish.

The invention is illustrated in the accompanying drawings wherein.

Figure 1:
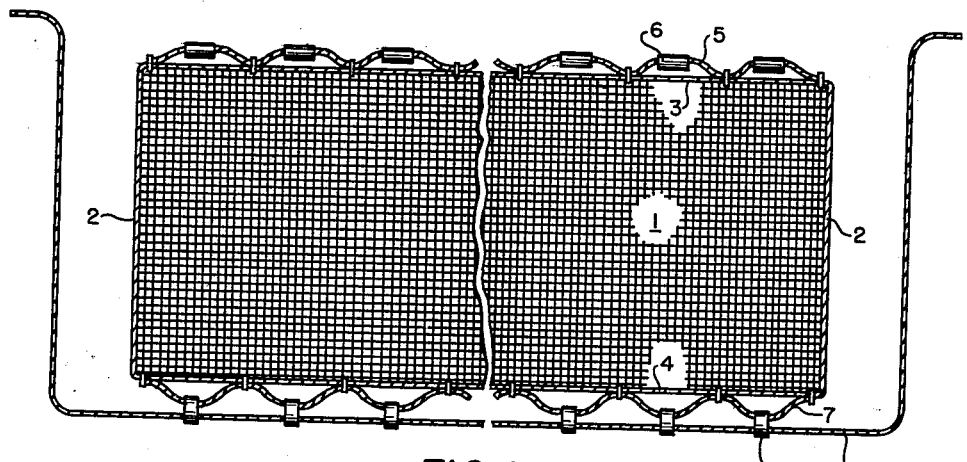
FIG. 1 is an elevational view of a purse seine extended in a vertical plane with its central longitudinal portion broken away and its end portions moved closer together.

A conventional purse seine 1 is illustrated in FIG. 1 and includes a rectangular fishing net, also designated with the reference number 1, having vertical margins 2, a top horizontal margin 3, and a bottom horizontal margin 4. A rope, termed a cork line 5, is attached to the top margin 3 by suitable clips and carries a series of floats 6 positioned at spaced intervals for supporting the upper edge of the seine in the water. A rope, termed a lead line 7, is attached to the bottom margin 4 by clips and carries rings 8 positioned at spaced intervals which act as weights to sink the bottom of the net in the water. A rope, termed a purse line 9, extends through the rings 8 and along both vertical margins 2 of the net 1. Once the seine has been arranged around or encircled around a school of fish, the purse line 9 is operated to purse or draw the bottom edge of the net 1 together.

In carrying out a typical purse seining operation, a large mother fishing ship 10 carrying a pair of small boats, termed purse boats 11 and 11', and the purse seine 1 folded in a conventional manner cruises in a favorable fishing area while keeping a lookout for a desirable school of fish. This lookout may be aided by an airplane which has radio communications with the ship 10. Once a school of fish 12 is sighted, the ship 10 moves near the school and launches the purse boats 11 and 11' carrying the folded seine net 1.

Figure 2:
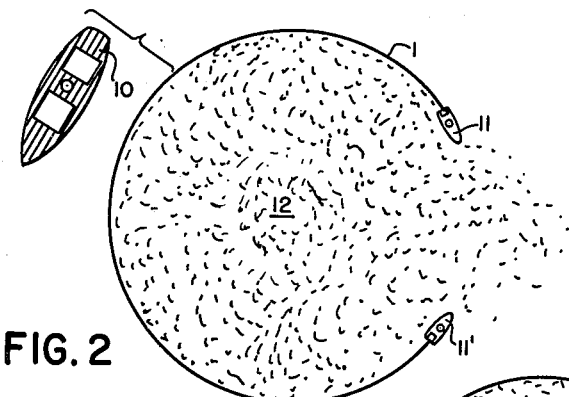
FIG. 2 is a diagrammatic plan view of an initial stage of a typical purse seining operation showing a school of fish being encircled with a purse seine.
Figure 3:
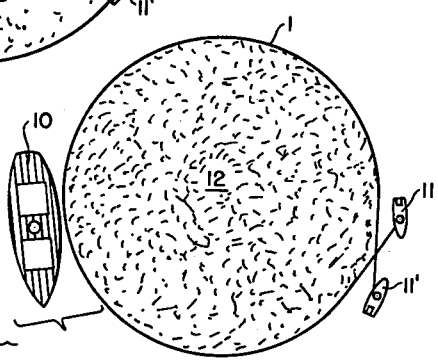
FIG. 3 is a plan view showing the school of fish completely encircled with the vertical ends of the purse seine overlapped.

When launched, the purse boats are moved directly to the periphery of the school where the center of the net is dropped into the water. Now, as indicated in FIG. 2, the boats separate and move in opposite directions around the periphery of the school, each boat paying out its half of the net progressively as it moves. Eventually the purse boats 11 and 11' meet as seen in FIG. 3 at which time the ropes holding the opposite vertical margins 2 of the seine net 1 are exchanged between purse boats so that the vertical margins 2 are overlapped and the school of fish 12 is encircled by the purse seine 1.

Figure 4:
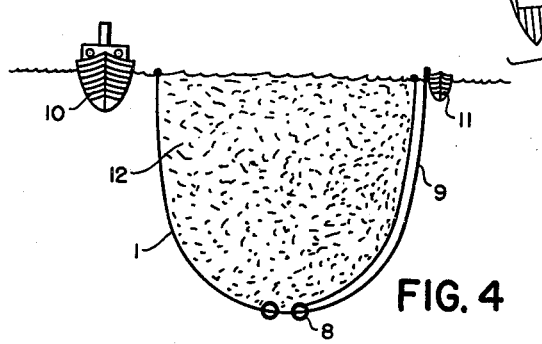
FIG. 4 is an elevational view showing the purse seine with its bottom edge pursed.

At this time, the purse line 9 is manipulated to draw or purse the bottom margin 4 of the net 1 together, thereby closing the bottom of the seine net 1 as illustrated in FIG. 4.

Figure 5:
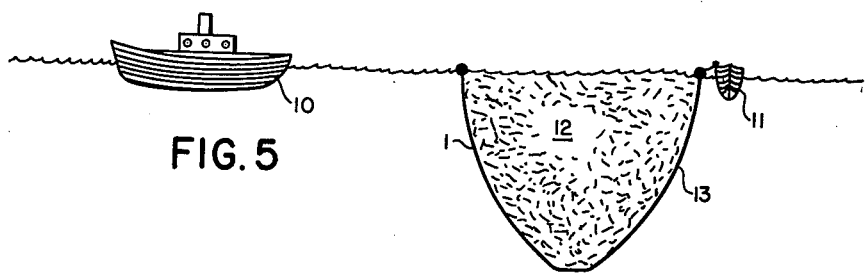
FIG. 5 is an elevational view showing the purse seine formed into a "bag" as a result of hauling up its vertical edges and pursed lower edge.
Figure 6:
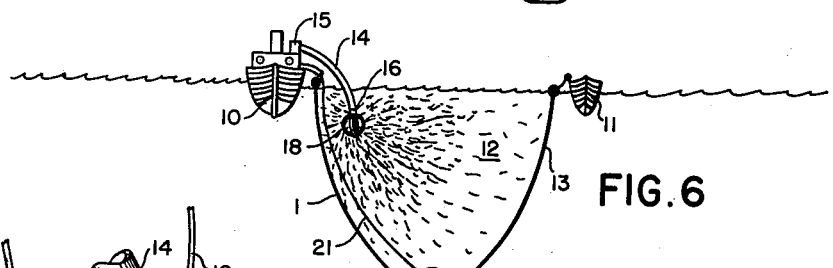
FIG. 6 is an elevational view showing the mother fishing ship alongside of the "bag" removing the trapped fish using the subject invention.

Next, the vertical margins 2 and the pursed bottom margin 4 of the seine net 1 are hauled into the purse boats 11 and 11' thereby forming the conventionally reinforced remainder of the net 1 into a relatively strong bag 13 in which the fish 12 are trapped as seen in FIG. 5. Using a conventional purse seine, the size of this reinforced bag is considerable and may have a depth ranging from 60 to 70 feet. All of these steps are conventional in the usual purse seining operation.

In the conventional purse seining operation, the pocket, formed by the net bag 13, is then progressively raised and reduced in size by pulling the uppermost portion of the net out of the water and into the purse boats until the fish are concentrated in a substantially solid mass so that a suction hose can draw them from the bag. This step of concentrating the fish is conventionally termed "drying out" the fish. My invention makes it possible to perform the "drying out" step electrically with a substantial increase in performance speed.

Figure 7:
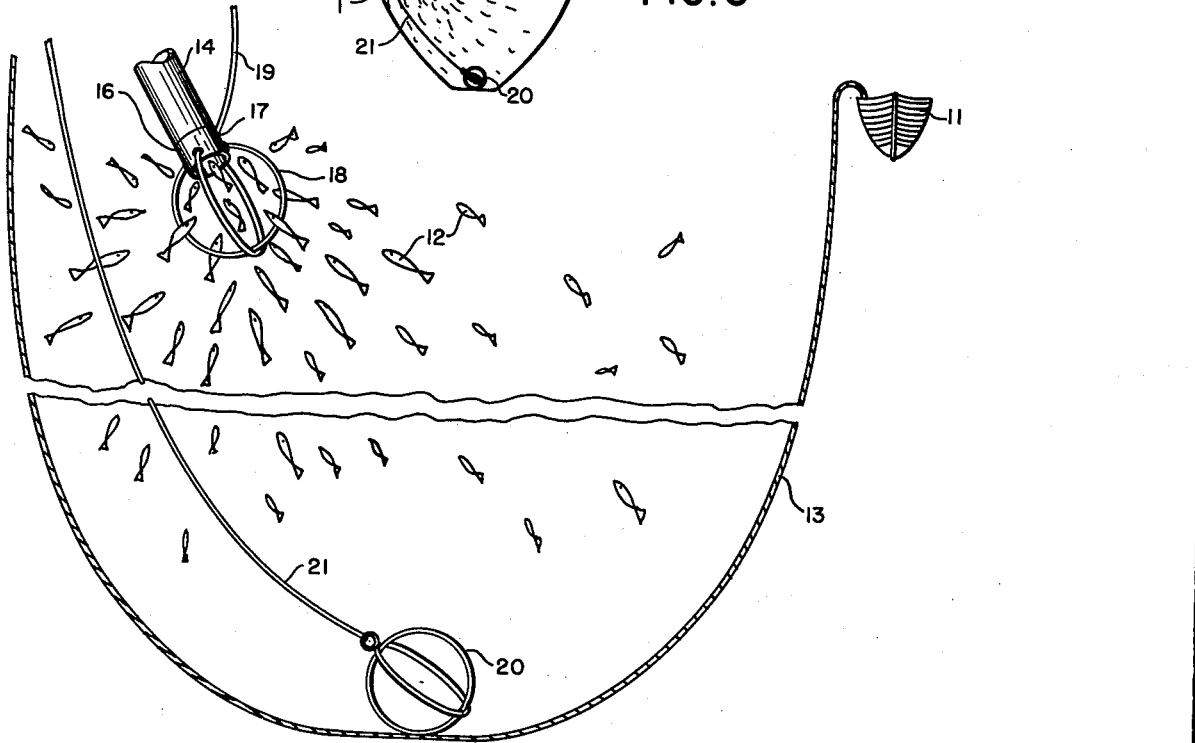
FIG. 7 is an enlarged view of FIG. 6 with its central vertical portion broken away and with its upper and lower portions moved closer together.

In carrying out my invention, the mother fishing ship 10 is provided with a conventional fish suctioning hose 14 connected to a pump 15 which discharges to a fish hold (not shown) in the ship 10. An electrode 16 is attached to the outer end of the hose 14 adjacent its mouth and includes a metal collar 17 fitted on the end of the hose and having a pair of crossed metal rings 18 extending from the collar over the hose mouth as illustrated in FIG. 7. This electrode is energized through an insulated conductor 19 which may be attached along the outside of the hose 14. A second electrode 20 is provided which is independent of the hose 14 and includes a pair of crossed metal rings which are anchored to and energized from the ship by a suitable insulated conductor 21.

After the fish 12 are trapped within the bag 13 formed by the net 1, the ship 10 is moved alongside one edge of the bag 13 and the hose mouth and electrode 16 are immersed beneath the surface of the water within the bag 13. The electrode 20 is dropped into the bag 13 and the conductors 19 and 21 are attached to a suitable power supply (not shown) carried on board the ship 10. It is preferable to sink the electrode 20 to the bottom of the bag 13, but it can be positioned elsewhere such as halfway to the bottom, or immediately outside the bag.

Once the electrodes 16 and 20 are arranged in the bag 13, the pump 15 is operated to place a suction on the hose 14 and the electrodes 16 and 20 are energized, the electrode 16 being energized as an anode and electrode 20 being energized as a cathode. The energizing or electro-fishing current may be either a sustained direct current or a pulsating direct current of the type illustrated in my copending application, Ser. No. 468,098, filed November 10, 1954, now Patent No. 2,792,659. The current flowing through the water between the electrodes 16 and 20 electrifies the water and compels the trapped fish 12 to swim rapidly toward and congregate around the anode electrode 16. As a result of congregating around the electrode 16, the fish 12 are sucked into the conduit 14 and deposited within the ship 10 at a very rapid rate. This is continued until substantially all of the fish 12 trapped within the bag 13 are deposited in the ship 10. The current in the water not only appears to compel the trapped fish to swim toward the hose mouth, but it seems to render the majority of fish powerless to swim away from the hose mouth. However, any fish that are able to swim away cannot escape because of the bag.

In practicing my invention, the operator must be careful to energize the electrodes with only enough current to produce the desired effect as a too high current may kill the fish as they approach the electrode 16. However, if the electrodes are properly energized, I have found that very few of the trapped fish will be killed, at least, before they are close enough to the hose mouth to be caught in the current of water flowing into the mouth and, thereby, suctioned into the hose. It does not particularly matter if the fish are killed in entering the hose mouth so long as they are caught by the hose suction before dying or becoming paralyzed.

By "electro-fishing" current, I mean a direct current of the sustained, pulsating or spaced impulse types disclosed, or usable in electro-fishing apparatus or operations of the character disclosed, in U.S. patents maturing from my previously filed U.S. applications on electro-fishing subjects matter. Among these are: #2,764,832, dated October 2, 1956; #2,792,659, dated May 21, 1957; #2,836,735, dated May 27, 1958; #2,850,832, dated September 9, 1958; and #2,850,833, dated September 9, 1958.

While my invention is ideally suited for use in purse seine operations, it will be appreciated that it is also suited for use in other applications. For example, in the herring fishing industry, it has been proposed: (a) to provide, in the ocean waters along the very edge of the shore, one or more localized watery pockets which are open at one end at least; (b) to cause fish in a school of herring to swim into these watery pockets; and then (c) to close the pockets in any suitable manner as by means of nets. Furthermore, freshly caught herring are always stored in watery pockets for 24 hours more or less before they are removed and canned. My invention may be used in effecting the removal of the freshly caught herring and the stored herring from these watery pockets. Such pockets may be provided with suction inlets which are fixed or otherwise permanently positioned. By "localized pocket," I mean a pocket which may vary in size between practical limits, the largest of which remains small enough to be properly electrified for effective fish control purposes. In other words, the largest size of pocket depends upon the "effective reach" of the electrifying equipment.

This application is a continuation-in-part of my application Serial No. 656,397, filed May 1, 1957, for "Purse Seine Pumping Method and Apparatus," now abandoned.

Having described my invention, I claim:

1. An improved method of recovering fish which are trapped in substantial numbers in the waters of a pursed seine or like net comprising: removing part of the net from the water so as to reduce the size of the net pocket within the water and correspondingly concentrate the fish in a smaller space which still provides them with swimming room; submerging the inlet of a suction hose in the waters of the net in which the fish are trapped; electrifying the waters in the net with an electro-fishing current of such strength and direction as to cause trapped fish to swim toward and congregate at said hose inlet in sufficient numbers to enable them to be suctioned from the water into and through the hose to a suitable receiver; and suctioning said congregated fish through said hose.

2. The method of claim 1 wherein the electrifying step is performed: by discharging the electro-fishing current between submerged electro-fishing anode and cathode electrodes; and locating the submerged anode adjacent the hose inlet in an operative position such that the fish congregating about the anode are massed at the hose inlet.

3. The method of claim 2 wherein the electrifying step is performed: by maintaining the intensity of the electrification of the waters adjacent the hose inlet at a strength which is insufficient to kill the massed fish.

4. The method of claim 2 wherein the electrifying step is performed: by locating the submerged cathode in position to electrify substantially all waters within the net during the transfer period.

5. An improved method of removing fish, which are trapped in the waters of a localized pocket of a size small enough to be electrified for effective fish control purposes, said pocket providing them with limited swimming room but preventing them from escaping, comprising: providing the waters of said localized pocket with the inlet of a suction hose; electrifying the waters of said pocket with an electro-fishing current of such strength and direction as to cause trapped fish to swim toward and congregate at said hose inlet in sufficient numbers to enable them to be suctioned from the water into and through the hose to suitable receiver; and suctioning said congregated fish through said hose.

6. A method of recovering fish comprising:
 (a) trapping fish in a localized watery pocket having walls, which surround the fish and prevent their escape from the pocket,
  (1) said pocket being large enough to provide the fish with swimming room and yet small enough to render practical the use of electricity for controlling the fish in the pocket;
 (b) providing the waters of said pocket with the inlet of a suction hose;
 (c) electrifying the waters of said pocket with an electro-fishing current of such strength and direction as to cause the trapped fish to swim toward and congregate at said hose inlet in sufficient numbers to enable them to be suctioned from the water into and through the hose to a suitable receiver; and
 (d) suctioning said congregated fish through said hose.

7. A fishing method comprising:
 (a) providing a localized watery pocket along the shore of a relatively large body of water,
  (1) said pocket initially being open at one end at least;
 (b) causing fish in said body of water to swim into said pocket;
 (c) closing said pocket to trap the fish therein;
 (d) providing the waters of said pocket with the inlet of a suction hose;
 (e) electrifying the waters of said pocket with an electro-fishing current of such strength and direction as to cause the trapped fish to swim toward and congregate at said hose inlet in sufficient numbers to enable them to be suctioned from the water into and through the hose to a suitable receiver; and
 (f) suctioning said congregated fish through said hose.

References Cited in the file of this patent

UNITED STATES PATENTS 2,163,282    Hovden _____ June 20, 1939
2,789,383    Solter _____ Apr. 23, 1957

OTHER REFERENCES

Discovery—January 1950 issue, page 29 (article entitled "Catching Fish by Electricity"). (Copy in the Library of the U.S. Patent Office.)